No. 695,731. Patented Mar. 18, 1902.
W. L. JUDSON.
EXPLOSIVE ENGINE.
(Application filed Jan. 11, 1901.)
(No Model.) 9 Sheets—Sheet 1.

No. 695,731. Patented Mar. 18, 1902.
W. L. JUDSON.
EXPLOSIVE ENGINE.
(Application filed Jan. 11, 1901.)
(No Model.) 9 Sheets—Sheet 2.

Witnesses,
Harry Kilgore
Mabel M. McIlroy

Inventor:
Whitcomb L. Judson,
By his Attorneys,
Williamson & Merchant

No. 695,731. Patented Mar. 18, 1902.
W. L. JUDSON.
EXPLOSIVE ENGINE.
(Application filed Jan. 11, 1901.)
(No Model.) 9 Sheets—Sheet 5.

Witnesses.
Harry Kilgore
Mabel M. McEnroy

Inventor.
Whitcomb L. Judson,
By his Attorneys,
Williamson & Merchant

No. 695,731. Patented Mar. 18, 1902.
W. L. JUDSON.
EXPLOSIVE ENGINE.
(Application filed Jan. 11, 1901.)
(No Model.) 9 Sheets—Sheet 6.

No. 695,731. Patented Mar. 18, 1902.
W. L. JUDSON.
EXPLOSIVE ENGINE.
(Application filed Jan. 11, 1901.)
(No Model.) 9 Sheets—Sheet 7.

Witnesses.
Mahl. M. McCrary
Harry Kilgore

Inventor.
Whitcomb L. Judson.
By his Attorneys,
Williamson & Merchant

No. 695,731. Patented Mar. 18, 1902.
W. L. JUDSON.
EXPLOSIVE ENGINE.
(Application filed Jan. 11, 1901.)
(No Model.) 9 Sheets—Sheet 8.

Witnesses.
Mabel M. McGovery
Harry Kilgore

Inventor.
Whitcomb L. Judson
By his Attorneys.
Williamson & Merchant

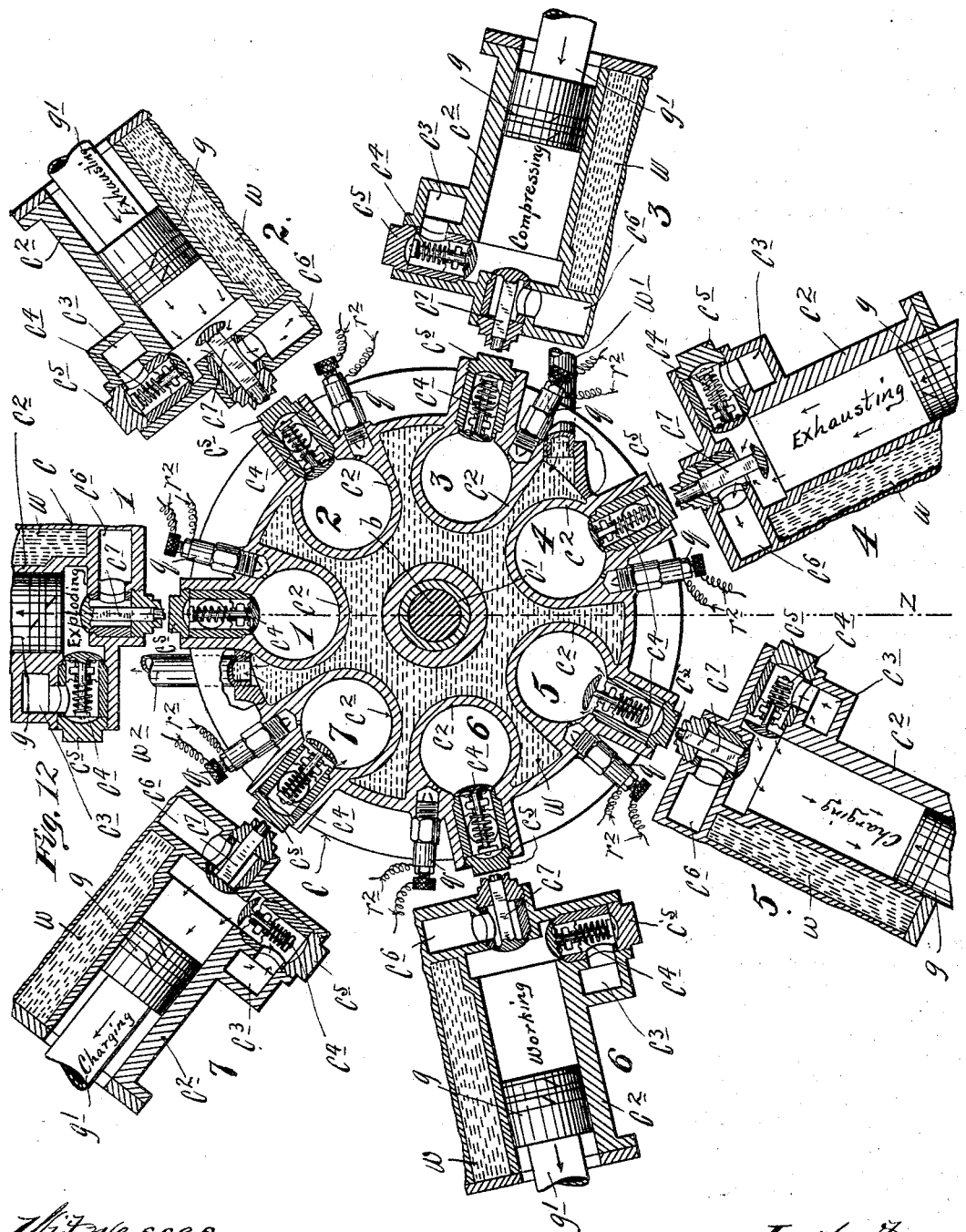

UNITED STATES PATENT OFFICE.

WHITCOMB L. JUDSON, OF CHICAGO, ILLINOIS.

EXPLOSIVE-ENGINE.

SPECIFICATION forming part of Letters Patent No. 695,731, dated March 18, 1902.

Application filed January 11, 1901. Serial No. 42,894. (No model.)

*To all whom it may concern:*

Be it known that I, WHITCOMB L. JUDSON, a citizen of the United States, residing at Chicago, in the county of Cook and State of Illinois, have invented certain new and useful Improvements in Explosive-Engines; and I do hereby declare the following to be a full, clear, and exact description of the invention, such as will enable others skilled in the art to which it appertains to make and use the same.

My invention has for its object to provide an efficient engine of compact form. The engine is organized for use as an explosive-engine; but many of the features are capable of general application in many classes of engines regardless of the form of the motive power employed.

To the ends above noted my invention consists of the novel devices and combinations of devices which will be hereinafter described, and defined in the claims.

The invention is illustrated in the accompanying drawings, wherein like notations refer to like parts throughout the several views.

Figure 1:
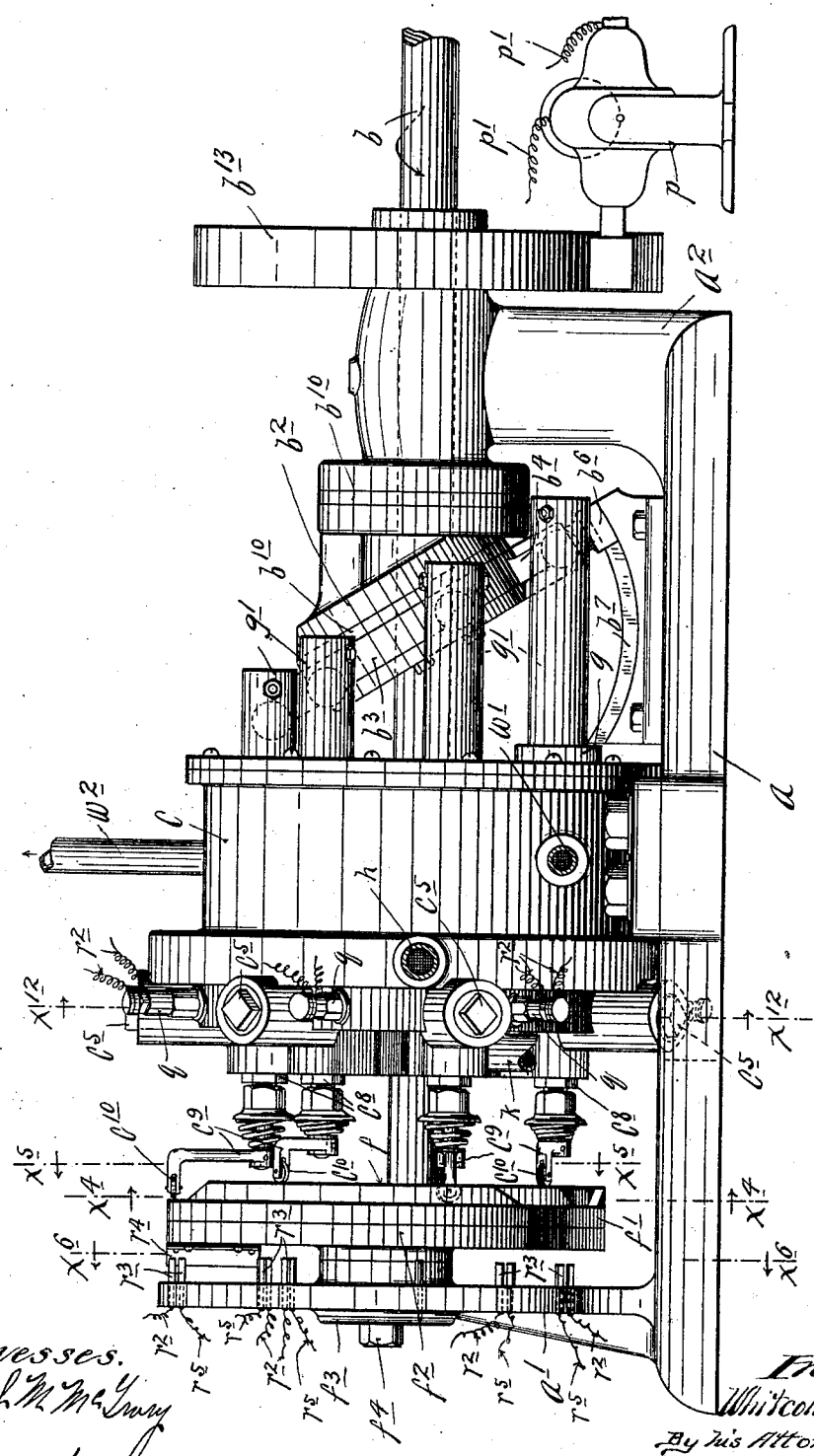
Figure 2:
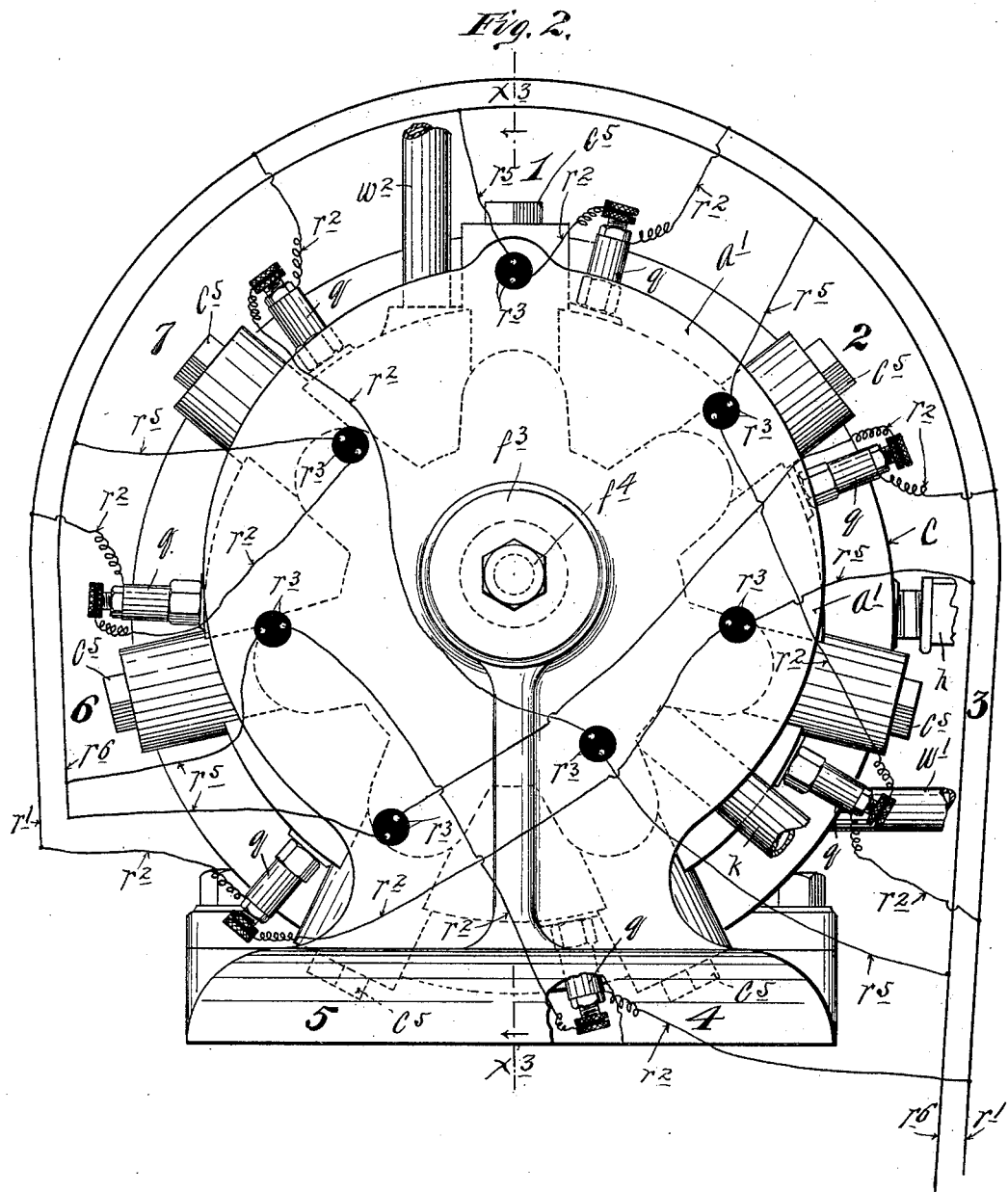
Figure 3:
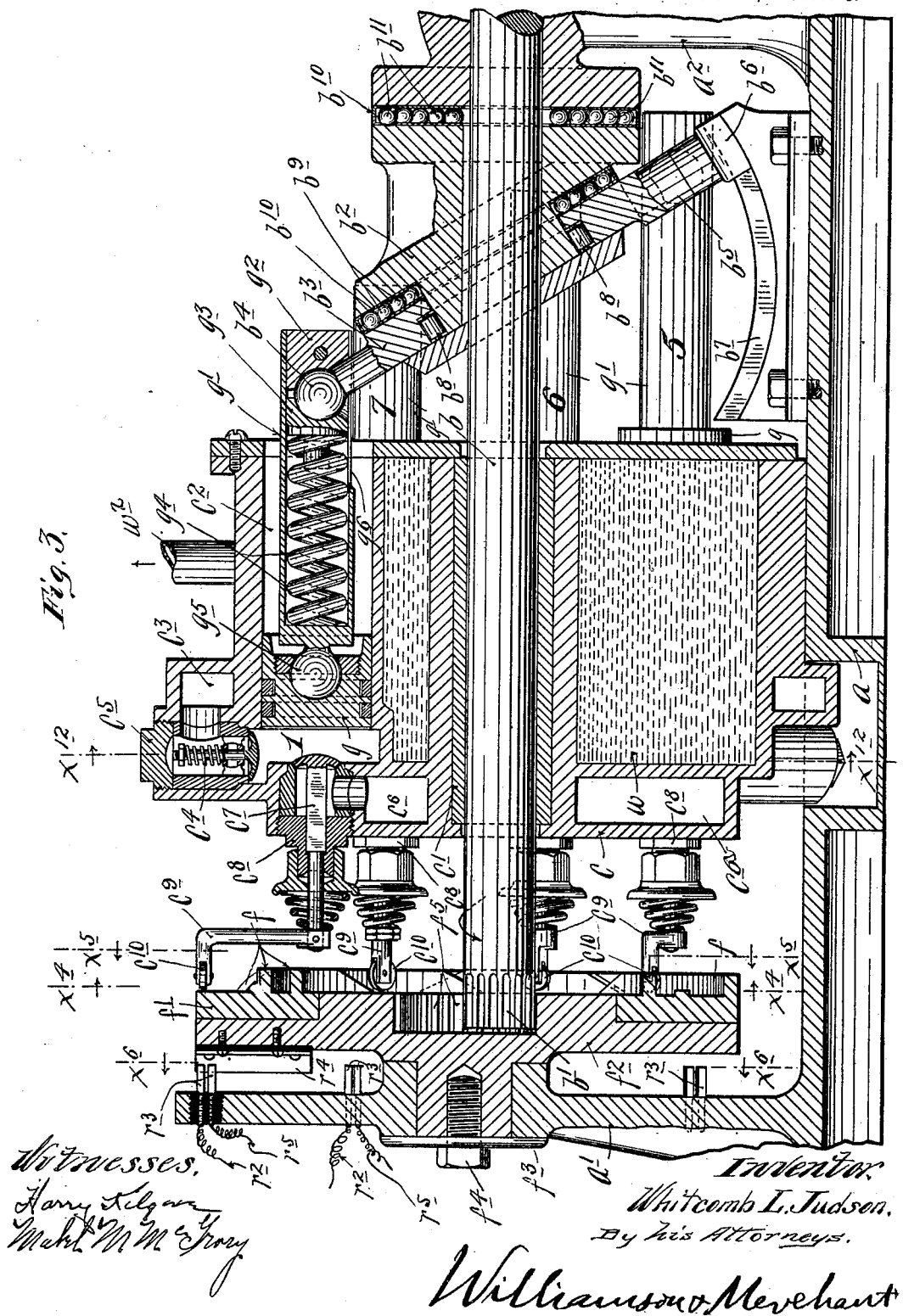
Figure 4:
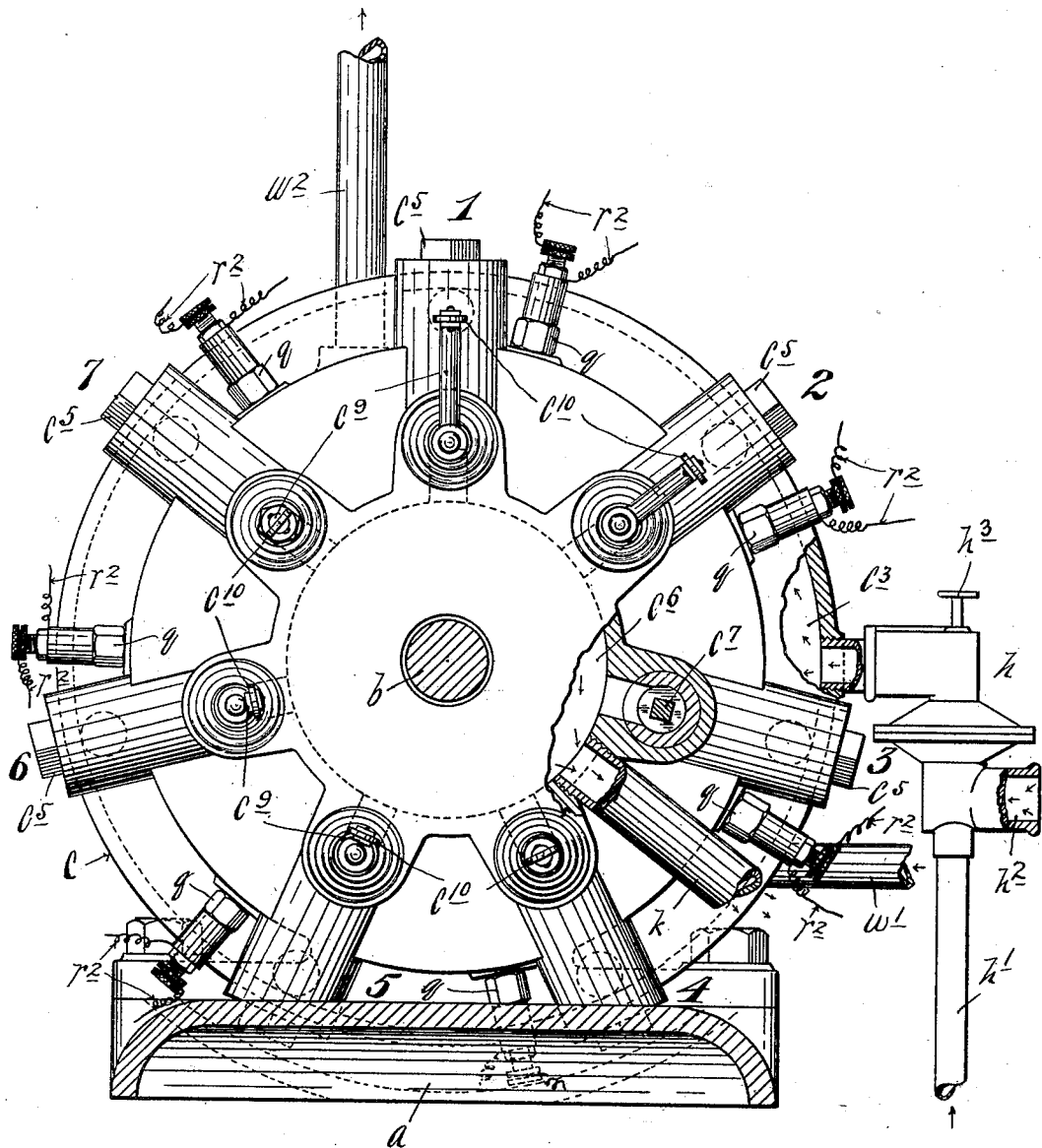
Figure 5:
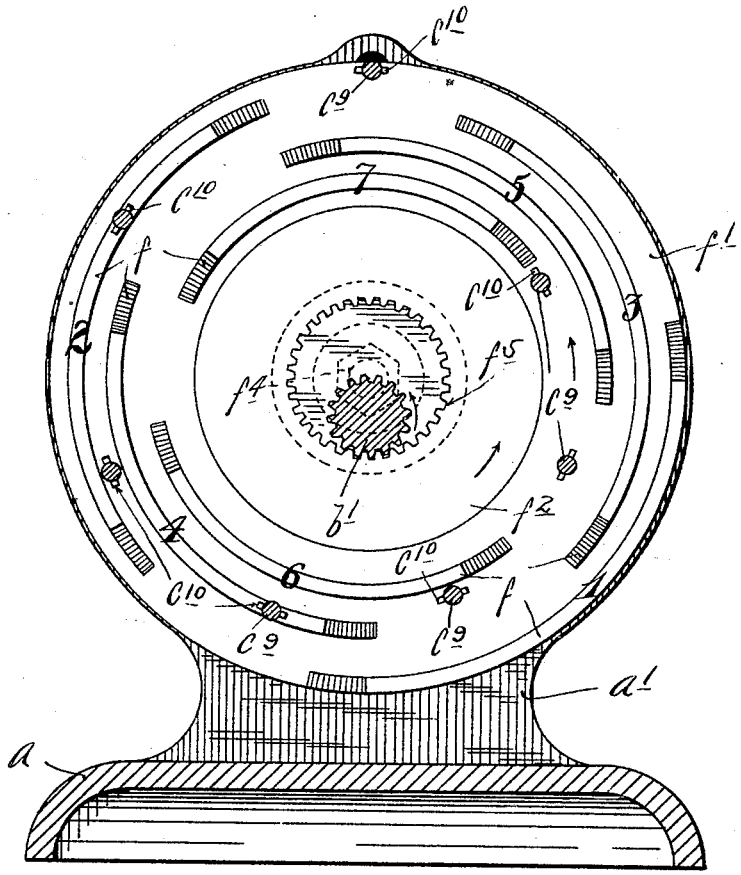
Figure 6:
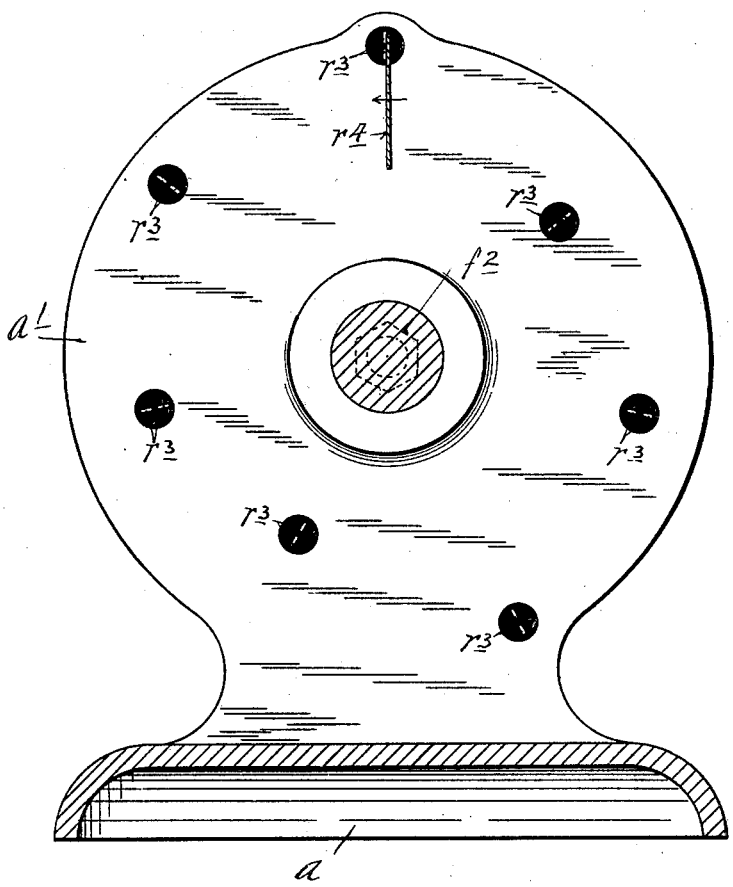
Figure 7:
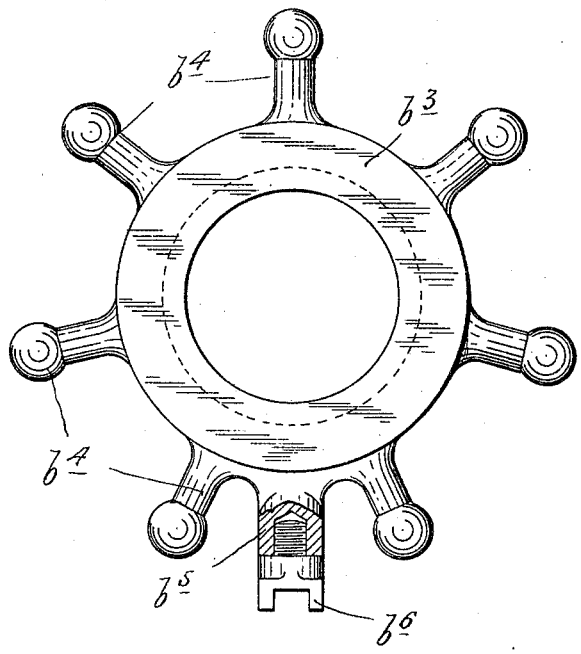
Figure 8:
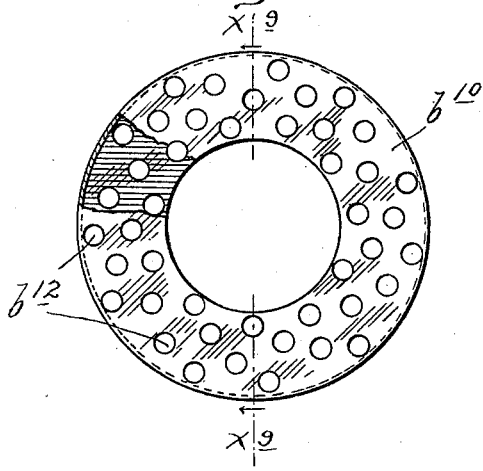
Figure 9:
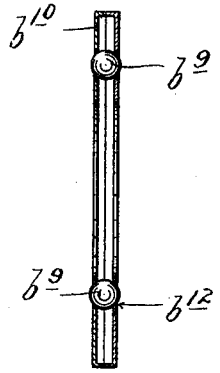
Figure 10:
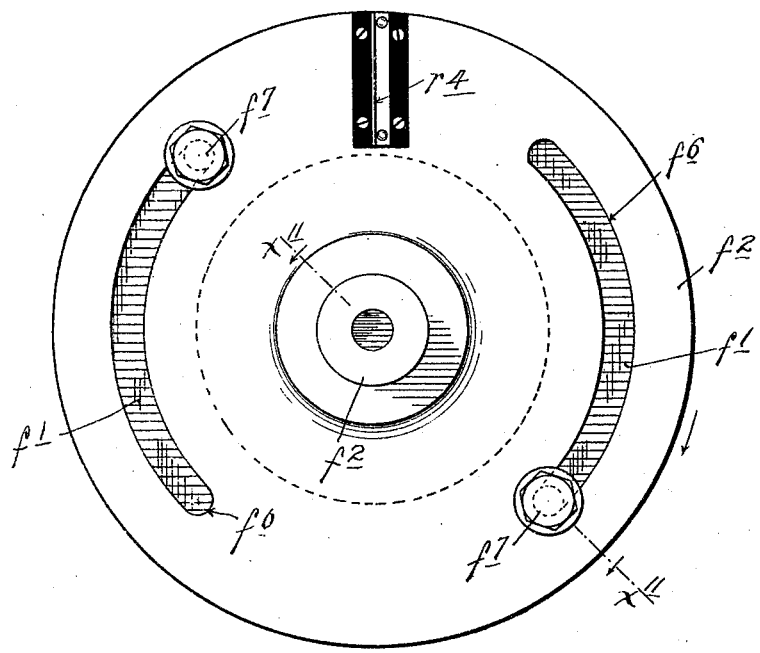
Figure 11:
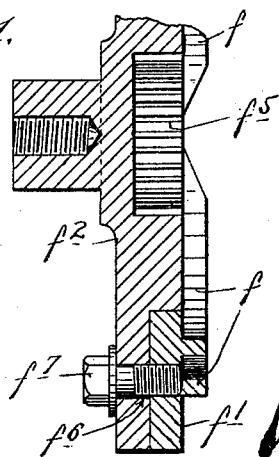

In said drawings, Figure 1 is a side elevation of the engine with some parts broken away and others removed. Fig. 2 is a left-end elevation with respect to Fig. 1 with some parts broken away. Fig. 3 is a vertical central longitudinal section on the line $x^3\ x^3$ of Fig. 2. Fig. 4 is a vertical cross-section substantially on the line $x^4\ x^4$ of Figs. 1 and 3 with some parts broken away. Fig. 5 is a vertical cross-section on the line $x^5\ x^5$ of Figs. 1 and 3. Fig. 6 is a vertical cross-section on the line $x^6\ x^6$ of Figs. 1 and 3. Fig. 7 is a detail in plan, showing the thrust-ring detached. Fig. 8 is a detail in plan, showing the holder for the ball-bearings detached with a portion broken away. Fig. 9 is a cross-section on the line $x^9\ x^9$ of Fig. 8. Fig. 10 is a detail in left-end elevation, showing the controller which carries the valve-gear cams and the controlling-contact of the igniter-circuit. Fig. 11 is a detail in section on the line $x^{11}\ x^{11}$ of Fig. 10; and Fig. 12 is a view in diagram for illustrating the relative actions of the plurality of engine-pistons at any given time, the central portion of the view being a true cross-section on the line $x^{12}\ x^{12}$ of Figs. 1 and 3 and the radial portions of the view being vertical central longitudinal sections through the engine-cylinders, but with the same turned out, so as to stand radial to the central portion of the view.

The main frame is shown as of oblong form and made up of a base-section $a$ having a pair of end pedestals $a'\ a^2$. To the base $a$ between the pedestals $a'$ and $a^2$ is bolted or otherwise rigidly secured a main casting $c$. This casting is of proper form to afford the main bearing $c'$ for the shaft $b$, which also has a bearing at its right end in the pedestal $a^2$. The casting $c$ is of proper form to afford a series of cylinders $c^2$, closed at their left-hand end and open at their right-hand end, arranged in a circle concentric to the shaft $b$, like the chambers of a revolver, and to afford a common valve-chest $c^3$ of annular form, with ports to the inner ends of the respective cylinders $c^2$ controlled by spring-seated intake-valves $c^4$, mounted in removable radially-seated plugs $c^5$. The main casting $c$ is also of proper form to afford a common exhaust-chamber $c^6$, with ports from the inner ends of the respective cylinders $c^2$ controlled by exhaust-valves $c^7$, which are spring-seated and normally held by their respective springs in their closed position. The exhaust-valves $c^7$ are also carried by removable plugs $c^8$, applied parallel to the shaft $b$. The bodies of the exhaust-valve stems are shown as of angular form in cross-section (square) and work through corresponding openings in their holding-plugs, thereby preventing the exhaust-valves from turning on their seats. The stems of the exhaust-valves $c^8$ carry rollers $c^{10}$, applied to the valve-stems by holders $c^9$ of proper shape to bring the rollers $c^{10}$ to the required positions for coöperation with the series of profile cams $f$, projecting from the inner face of a cam-ring $f'$, suitably mounted on a controlling disk or wheel $f^2$, which is journaled in the left-end frame-pedestal $a'$, as best shown in Figs. 1 and 2, and secured thereto, with freedom for rotary motion thereon, by a washer-cap $f^3$ and a screw-bolt $f^4$, working through the cap and tapped into the journal of the wheel $f^2$. The controlling-wheel $f^2$ is provided with an internal gear $f^5$, which is engaged by teeth, affording a pinion end $b'$ at the left-hand extremity of the shaft $b$. The pinion $b'$ and the internal gear $f^5$ on the controller $f^2$ are related as one to two, so that the shaft may turn twice while the controller turns once. This affords the proper relations for operating the exhaust-valve $c^8$ from the profile cams $f$ on the cam-ring $f'$ at the proper times relative to each other, assuming the said cams $f$ to be properly positioned. The controller $f^2$ is provided with segmental slots $f^6$, through which work screw-bolts $f^7$, that are tapped into the cam-ring $f'$. This affords a means of shifting the cam-ring $f'$ through ninety degrees and securing the same at either limit of its possible adjustment rigidly to the rotary controller $f^2$. This is for the purpose of permitting the engine to be run in either direction, according to the position in which the cam-ring $f'$ may be set on the controller $f^2$.

On the shaft $b$ is fixed a crank $b^2$ at an oblique angle to the axes of the several cylinders $c^2$. On the crank $b^2$ is loosely seated a thrust-ring $b^3$, set in the same plane as the crank itself relative to the axes of the cylinders $c^2$. The thrust-ring $b^3$ is shown as provided with a series of radial arms $b^4$, which terminate in round or ball-like tips. The thrust-ring is also provided at one point with a radial arm $b^5$, having a cross-head $b^6$, which embraces a segmental guide $b^7$, that is bolted or otherwise rigidly secured to the base-plate $a$ of the fixed frame. By this cross-head and guide the thrust-ring $b^3$ is free for angular motion lengthwise of the shaft, as required under the rotary motion of the crank $b^2$; but is held stationary in respect to the rotary motion of the shaft. In other words, the thrust-ring has a wabble motion, but no rotary motion. It is held from rotary motion by its cross-head and guide.

In the cylinders $c^2$ are mounted corresponding pistons $g$, which are suitably coupled to the crank by means of piston-rods $g'$ and half-socket bearings $g^2$ $g^3$, which embrace the ball-tips on the radial arms $b^4$ of the thrust-ring $b^3$. Of said half-socket bearings the outer members $g^2$ are fixed to the hollow piston-rods $g'$ and the inner members $g^3$ are fitted to work therein as plungers and are subject to stiff compression-springs $g^4$, which react between the plungers $g^3$ and the inner end of the bore in the hollow piston-rods $g'$. The piston-rods $g'$ connect to the pistons $g$ by ball-and-socket joints $g^5$. The piston-rods $g'$ are slotted, as shown at $g^6$ in Fig. 3, to permit the relative motion of the piston-rods in respect to the radial arms $b^4$ of the thrust-ring $b^3$.

The thrust-ring $b^3$ is mounted on roller-bearings $b^8$, and the end thrust is taken against ball-bearings $b^9$. The end thrust between the crank $b^2$ and the shaft-bearing afforded by the end pedestal $a^2$ is also taken on ball-bearings $b^{11}$. The ball-bearings $b^9$ and $b^{11}$ are carried by two-part holders $b^{10}$ (best shown in Figs. 8 and 9) the face-plates of which are suitably perforated to afford holding-seats $b^{12}$ for the balls, thus properly spacing the same apart while permitting the protruding portions of the balls to work against the proper bearing-surfaces in a manner which is obvious from an inspection of Figs. 3, 8, and 9.

The valve-chest $c^3$ is shown in Fig. 4 as tapped by a vaporizer $h$ of any suitable form, such as any of the standard makes, having supply-pipe $h'$ for the gasolene and $h^2$ for the air and subject to a suitable controlling-valve $h^3$.

The exhaust-chamber $c^6$ is tapped by an exhaust-pipe $k$. (Best shown in Figs. 2 and 4.)

The shaft $b$ is shown as provided with a suitable fly-wheel $b^{13}$.

The main casting $c$ is of proper form to afford a chamber for cooling-water $w$, which is kept in circulation in any suitable way, the same, as shown, being supplied through supply-pipe $w'$ and passed out through the pipe $w^2$. The water-chamber is so located as to bring the water well into contact with all the cylinders $c^2$ and a considerable portion of the valve-chambers.

For firing the charges I employ electric igniters, (preferably,) and for supplying the current I have shown (in Fig. 1) in diagram a generator $p$ of the well-known "autosparking" type, which is driven from the fly-wheel $b^{13}$ in the usual way. Only the generator-terminal portions of the leads $p'$ of the primary circuit are shown. It has not been thought necessary to show the induction-coil and connections between the primary and secondary circuit. The secondary-circuit leads are illustrated in Fig. 2 with portions broken away and are marked $r'$ $r^6$, respectively. The jump-spark plugs $q$ are tapped into the cylinders $c^2$ in the usual or any suitable way, with the jump-contacts properly positioned to ignite the charge when the secondary circuit is closed. As shown, the plugs $q$ are so mounted that the sparking-terminals are within small chambers that open into the explosion ends of the cylinders $c^2$. From the lead $r'$ of the secondary circuit branch leads $r^2$ extend through the sparking-plugs $q$ to one member of a pair of insulated contacts $r^3$, mounted in the end pedestal $a'$, and from the other member of said pair of contacts $r^3$ a conductor $r^5$ connects with the return lead $r^6$ of the secondary circuit. On the outer face of the rotary controller $f^2$ is mounted an insulated circuit-controlling contact $r^4$ of the proper length to connect the pair of contacts $r^3$, for which purpose the inner ends of the contacts $r^3$ project into the path of the controlling-contact $r^4$, carried by the controller. The pairs of insulated contacts $r^3$, fixed in the pedestal $a'$, are properly located for coöperation with the controlling-contact $r^4$ in the proper succession for firing the proper cylinders. This relation of the insulated contacts $r^3$ in the pedestal $a'$ to the sparking-plugs $q$ with which they connect is best shown in Fig. 2, and the timing will better appear in tracing the general actions of the machine as an entirety, which will now be done. For this purpose attention is especially called to the diagram view, Fig. 12. It should first be noted that these explosive-engines are of the four-stroke cycle type. Hence the valve-gear and engine-shaft must be related as two to one. Otherwise stated, the shaft is turned twice, while the rotary controller $f^2$, with the parts carried thereby, turns once. This is secured by the relation of the pinion end $b'$ of the shaft $b$ to the internal gear $f^5$ on the controller $f^2$, as hitherto stated. It is incidental to said relations, or, in other words, to said four-cycle type, that the plurality of engines must aggregate an odd number and that the cycle of actions must alternate between the odd and even numbered sets of engines.

For the purpose of better tracing the actions the cylinders and, so far as necessary, the parts which coöperate with the respective cylinders are numbered from 1 to 7, inclusive. In other words, the cylinder whose connecting-rod takes hold of a thrust-pin at the upper dead-center, as shown in Fig. 3, is numbered 1 and the other cylinders are numbered consecutively in the order of sequence in the direction of the rotation of the shaft $b$ and the crank $b^2$. The several cylinders are of course properly spaced apart from each other, and their several piston-rods take hold of the thrust-ring $b^3$ at different points circumferentially thereof. Owing to the fact that the crank-disk $b^2$ sets at an oblique angle to the axes of the engine-cylinders, it follows that under the resolution of forces from the working strokes of the pistons the crank $b^2$ and the shaft $b$ will receive a rotary motion. It further follows that the thrust-ring $b^3$ has a wabble motion in respect to the shaft, the part thereof on one side of a vertical line through the axis of the shaft moving lengthwise of the shaft in one direction, while the other part moves lengthwise of the shaft in the opposite direction. Hence it follows that all the pistons on one side of this dividing-line must be moving out when those on the other side thereof are moving in. In the diagram view, Fig. 12, the observer is supposed to be looking from the left, and the central portion of the view is shown as the parts would appear on the section-line $x^{12}$. The arrow shows the direction of rotation of the shaft $b$. The vertical line $z$ is an imaginary line through the axis of the shaft with a view of considering the sets of cylinders which connect to opposite halves of the thrust-ring $b^3$. If cylinder numbered 1 be assumed to be at the upper dead-center at the given instant, as stated, and an explosion be just taking place therein, then the actions taking place in the other cylinders will be as marked thereon in Fig. 12. For example, cylinder 2 will be exhausting, cylinder 3 will be compressing, cylinder 4 will be exhausting, cylinder 5 will be charging, cylinder 6 will be working, and cylinder 7 will be charging.

To make the valve motions come right, the profile cams $f$ must of course be properly disposed on the ring $f'$. The seven cams $f$ are in concentric arrangement on the ring $f'$, and each cam $f$ is ninety degrees behind the point on the ring which will be opposite to the exhaust-valve of the engine that is controlled by that particular cam at the instant of explosion. Hence under the two-to-one motion the exhaust will begin after the shaft has made a half-turn, thereby moving the controller $f^2$ and cam-ring $f'$ a quarter-turn, or ninety degrees. This makes all the actions come right, so far as the opening of the exhaust-valves is concerned.

Respecting the ignition, it is probably sufficient to state that the insulated spring-contacts $r^3$ in the pedestal $a'$ are properly located with respect to the rotary motion of the controller $f^2$ and the bridge-contact $r^4$ carried thereby to close the secondary circuit through the proper plug at the proper time under the rotary motion of the controller timed, as stated, to turn once while the engine-shaft turns twice. Hence it happens, as will appear from an inspection of Fig. 2, that the particular contacts $r^3$, which coöperate with the bridge-contact $r^4$ to close the secondary circuit through the jump-spark plug $q$ for any given cylinder, may not be located either directly opposite or any ways near the particular engine wherein the explosion is to take place. It is obvious, however, that the wiring can be arranged to effect the firing, as desired, in the required order for the proper action of the several engines. This arrangement is clear from the illustration given in Fig. 2.

From the foregoing statements and the showing made in the diagram view, Fig. 12, it is obvious that one or more of the pistons is always delivering a working stroke to the thrust-ring $b^3$ and through the same to the crank $b^2$. Hence the shaft can be kept in continuous motion under the use of four-stroke cycle explosive-engines without requiring a heavy fly-wheel. In fact, the fly-wheel may be extremely light or possibly be dispensed with altogether. It is also obvious that the pistons deliver their working strokes to the thrust-ring and crank under a yielding action. This is important for securing the best results with a plurality of engines thus coupled to a common crank. With the use of a spring it is not necessary that the relative timing of the engines to the motion of the crank should be such as to permit the independent actions of the pistons, because the pistons under the working stroke can compress the springs, thereby storing up the power which may be delivered from the springs to the thrust-pin as rapidly as permitted under the rotary motion of the crank. The springs of course serve the further function of cushions, avoiding breakage and violent shocks. The ball-and-socket connections between the piston-rods and the pistons at one end and the thrust-pin at the other are desirable as the best provision for permitting the necessary angular motions of the coupled parts. The use of the left-hand end of the crank-shaft as a pinion in coöperation with the internal gear on the controller $f^2$ affords an extremely simple way of getting the desired two-to-one motion required to operate the exhaust-valves and the igniters. It must be further obvious that with this design of engine great compactness of structure is secured, thereby enabling relatively large power to become available with the use of comparatively little weight. These various features especially adapt this engine for use on automobiles.

While the engine, as illustrated, is designed as a four-cycle explosive-engine, it must be obvious that some of the features involved are capable of use on engines employing other forms of fluid-pressure. This has been defined as set on an oblique angle with reference to the axis of the cylinder or the axis of a series of cylinders rather than with reference to the axis of its own rotation, for the reason that the crank might be carried on a shaft-section which was itself set at an angle to another shaft-section driven thereby, thereby securing the necessary obliquity or the proper angular relation for coupling the same to the piston-rods of a series of engines which might be mounted to turn with the driven section of said two shaft members. In fact, I have worked out such a design wherein the plurality of engines, with their valves, &c., are all mounted to revolve together about a common axis and the several pistons are coupled to a crank-disk on a shaft-section which is set at an angle to the axis of the engine's rotation or main shaft-section and connects thereto by bevel-gearing cut on the adjacent ends of the two shaft-sections. That modification gives me what I call an "air-cooled" gas-engine. The revolution of the cylinders through the air serves to keep the cylinders sufficiently cool without requiring the application of cooling-water. That modification or form of engine has been made the subject-matter of another application—to wit, Serial No. 57,452, filed April 25, 1901, entitled "Explosive-Engines." Reference is made to the same here to afford the proper point of view in considering certain of the broad claims presented in this case.

It will be understood, of course, that many of the details of the construction might be changed without departing from the spirit of my invention.

What I claim, and desire to secure by Letters Patent of the United States, is as follows:

1. The combination with an engine-shaft having a crank set at an oblique angle thereto, of a thrust-ring loosely seated on the crank, at the same angle to the shaft as the crank itself, and a plurality of reciprocating engines having their pistons coupled to said thrust-ring, substantially as described.

2. The combination with an engine-shaft having a crank set at an oblique angle to the axis of the shaft, of a thrust-ring loosely seated on the crank at the same angle to the shaft as the crank itself, a plurality of reciprocating engines having their pistons coupled to said thrust-ring, and means for preventing the rotation of the thrust-ring, substantially as and for the purposes set forth.

3. The combination with a plurality of engine-cylinders, of the engine-shaft having a crank set on an oblique angle to the cylinder-axes, the thrust-ring loosely seated on the crank and provided with a cross-head and guide restraining the same from rotary motion, and the reciprocating pistons in said cylinders coupled to said thrust-ring, substantially as and for the purposes set forth.

4. The combination with a plurality of engine-cylinders, of a shaft having a crank set at an oblique angle to the axes of said cylinders, reciprocating pistons in said cylinders coupled to said crank, a rotary controller having an internal gear engaging teeth on said shaft and provided with cams for operating the exhaust-valves of said engines with the properly-timed action for explosive-engines of the four-cycle type, substantially as described.

5. The combination with a plurality of engine-cylinders, of a shaft having a crank set at an oblique angle to the axes of said cylinders, reciprocating pistons in said cylinders coupled to said crank, a rotary controller having an internal gear engaging teeth on said shaft, with said gear-connected parts related as one to two, a series of cams on said controller for actuating the exhaust-valves of said engines, electric igniters for said engines, and electric connections for the same, including a series of pairs of insulated contacts held in a stationary position, and a controlling-contact carried by said rotary controller for coöperation with said fixed pairs of contacts to close the circuit through the proper igniters in the proper succession, substantially as described.

6. The combination with an engine-shaft having a crank set at an oblique angle thereto, of a thrust-ring loosely seated on said crank, at the same angle to said shaft as said crank itself, and a plurality of reciprocating engines provided with yielding or spring pistons which are coupled to said thrust-ring, substantially as described.

In testimony whereof I affix my signature in presence of two witnesses.

WHITCOMB L. JUDSON.

Witnesses:
JOHN M. YOUNG,
JOHN F. KINGWELL.